US008538145B2

(12) United States Patent
Finlayson et al.

(10) Patent No.: US 8,538,145 B2
(45) Date of Patent: Sep. 17, 2013

(54) GAMMA ADJUSTMENT FOR MAXIMIZING INFORMATION IN IMAGES

(75) Inventors: Graham Finlayson, Taverham (GB); Ruixia Xu, Baton Rouge, LA (US)

(73) Assignee: Apple Inc., Cupertino, CA (US)

(*) Notice: Subject to any disclaimer, the term of this patent is extended or adjusted under 35 U.S.C. 154(b) by 204 days.

(21) Appl. No.: 13/111,625

(22) Filed: May 19, 2011

(65) Prior Publication Data

US 2012/0114236 A1    May 10, 2012

Related U.S. Application Data

(60) Provisional application No. 61/410,838, filed on Nov. 5, 2010.

(51) Int. Cl.
 *G06K 9/00* (2006.01)
(52) U.S. Cl.
 USPC .......................................................... 382/167
(58) Field of Classification Search
 USPC ................. 382/162, 167–168, 254, 272, 274; 359/1.9, 518–519; 348/254
 See application file for complete search history.

(56) References Cited

U.S. PATENT DOCUMENTS

| 4,568,978 | A | 2/1986 | Cosh | |
|---|---|---|---|---|
| 6,826,310 | B2 * | 11/2004 | Trifonov et al. | 382/274 |
| 6,941,028 | B2 * | 9/2005 | Kimmel et al. | 382/274 |
| 7,068,853 | B2 * | 6/2006 | Loveridge et al. | 382/274 |
| 7,319,787 | B2 * | 1/2008 | Trifonov et al. | 382/168 |
| 7,375,854 | B2 * | 5/2008 | Hsu et al. | 358/1.9 |
| 7,899,266 | B2 * | 3/2011 | Mitsunaga | 382/274 |
| 7,916,936 | B2 * | 3/2011 | Kondo | 382/162 |
| 8,166,563 | B2 * | 4/2012 | Ojeda | 726/27 |
| 8,345,975 | B2 * | 1/2013 | Wang et al. | 382/173 |
| 2005/0226526 | A1 | 10/2005 | Mitsunaga | |
| 2006/0066546 | A1 | 3/2006 | Miyasaka | |

* cited by examiner

*Primary Examiner* — Jose Couso
(74) *Attorney, Agent, or Firm* — Wong, Cabello, Lutsch, Rutherford & Brucculeri, LLP

(57) ABSTRACT

Methods, systems, and apparatus, including computer programs encoded on computer storage media, are described for transforming an image at least in part by using a gamma transformation that maximizes information in the transformed image. In one aspect, a digital image is received and brightness of the digital image is determined. The brightness of the digital image can include luminance or color. Maximum available detail in the digital image is brought out at least in part by applying to the brightness of the digital image a first gamma exponent that is equal to one divided by a negative of an average logarithm of the brightness of the digital image.

30 Claims, 9 Drawing Sheets

GAMMA ADJUSTMENT FOR MAXIMIZING INFORMATION IN IMAGES

CLAIM OF PRIORITY

This application claims priority under 35 USC §119(3) to U.S. patent application Ser. No. 61/410,838, filed on Nov. 5, 2010, the entire contents of which are hereby incorporated by reference.

BACKGROUND

This specification relates in general to image processing and in particular to gamma adjustments.

An image is a 2-dimensional array of pixels values where each value encodes brightness. A color image has 3 brightness values per pixel encoding respectively, a red value, a green value and a blue value. More than three values per pixel can be recorded, e.g. if a near-infrared picture of a scene is also captured. For convenience, in this specification an image has a single brightness value per pixel location (though the methods described herein can be applied to all types of images. Further, and without loss of generality, brightness values are numbers in the range 0 to 1 (mathematically in the interval [0, 1]).

Brightness values can be changed in an image to better bring out detail. For example, often in images the details in the shadows are too dark to see. Brightening an image can make these details visible. An image can be brighten or darken in multiple ways, for example, by applying a gamma transformation to the image. The gamma transformation of an image is performed by raising the brightness values in an image to a power gamma. Let B denote brightness of an image and $B_{ij}$ the brightness at the ($i^{th}$, $j^{th}$) pixel location. The brightness of an image or pixel can be changed via a gamma adjustment (transformation) by:

$$B \to B^\gamma, B_{ij} \to B_{ij}^\gamma \qquad (1),$$

where $\gamma$ is in (0, ∞]. In this manner, brightness values in the range [0,1] map to the same interval after the gamma correction. Sometimes changing brightness of an image via a gamma transformation according to equation (1) is called changing contrast. For example, a brightness contrast adjustment can be determined as $B \to \alpha B^\gamma$. If gamma is equal to 1, greater than 1 or less than 1, then the image is unchanged, made darker and made brighter, respectively. A gamma adjustment has the advantage that the whole input brightness range is mapped to the whole output range.

FIG. 1 shows an example of a gamma transformer 150 used to perform gamma adjustments on an original image 102. For example, the original image 102 can be transformed to a darker image 104 and to a brighter image 106 by applying gamma exponents of 2 and 0.5, respectively. The gamma transformer 100 uses transfer functions 152, 154, 156 to map the input brightness range of image 102 to output brightness ranges of images 102', 104, 106, respectively. For example, to obtain image 102' the identity function 152, corresponding to $\gamma=1$, is used. Notice that a fractional gamma transformation 154 stretches dark values but compresses highlights, as illustrated in the output image 106. Conversely, a gamma transformation 156 which uses a gamma exponent that is bigger than 1 stretches highlights and compresses shadow detail, as illustrated in the output image 104.

The gamma transformer 150 can be implemented as part of photo-editing software programs and can provide a user with a control for adjusting gamma to change the look of an image. In this manner, detail can be brought out in the image. An image that is too dark may look better when a fractional gamma exponent is used for the applied gamma transformation. However, if a very small gamma exponent is used for the applied gamma transformation, then the highlight detail can become too compressed and the detail gained in the shadows may be achieved at the cost of loss of details in the highlights. There exist multiple ways to adjust gamma in images. If an image is, on average, bright then, intuitively, a gamma exponent larger than 1 (e.g., 154) can be selected to make the image darker. Or if the image is, on average, dark then a fractional gamma exponent (e.g., 156) can be applied.

FIG. 2 shows another example of a gamma transformer 250 used to perform gamma adjustments on original image 102. The gamma transformer 250 uses an exponent gamma defined as $$\gamma = 2^{\left(\frac{\mu_A - 0.5}{0.5}\right)}, \qquad (2)$$

where $\mu_A$ is the arithmetic mean of the image brightness. When $\mu_A$ is equal to 0.25, 0.5 and 0.75, gamma is respectively equal to 0.701, 1 and 1.41. For example, when the original image 102 is dark on the average, a fractional gamma is used to generate a transformed image 108 brighter than the original image 102 by applying the gamma transformation associated with gamma transformer 250. When the average brightness of the original image 102 is 0.5 the image stays the same under the gamma transformation associated with gamma transformer 250. And, when the mean is greater than 0.5 the resulting gamma is larger than 1 so a transformed image 108 darker than the original image 102 is generated by applying the gamma transformation associated with gamma transformer 250. The image 108 represents the output of gamma transformer 250 for the input image 102, when the exponent gamma is 0.85 (as calculated using equation (2)). Moreover, the gamma transformer 250 can calculate the average $\mu_A$ by convolving the image 102 with a Gaussian filter with large support (e.g., having a standard deviation proportional to the size of the image). The resulting average $\mu_A$ is a blurred version of the input. Strong blurring may be needed to avoid halo artifacts in the output image.

Further by construction, the minimum fractional gamma determined based on equation (2) is 0.5 and the maximum gamma is 2. Gamma transformations having gamma exponents in this range are conservative and so the gamma transformer 250 can only make mild changes to image content. A repeater 260 can be used to return an image transformed by the gamma transformer 250 as an input image back to the gamma transformer 250 for iteratively applying the gamma adjustment corresponding to equation (2). The output of the gamma transformer 250 after 5 iterations is image 110. In using the combination of gamma transformer 250 and repeater 260, it is challenging to decide how many iterations of the gamma adjustment corresponding to equation (2) should be applied to continue improving the look of the original image 102. This challenge indicates that the gamma calculated in equation (2) is not optimal.

SUMMARY

In this specification, systems and techniques are described for transforming an image at least in part by using a gamma transformation that maximizes information in the transformed image.

In general, one innovative aspect of the subject matter described in this specification can be implemented in methods that include the actions of receiving a digital image and determining brightness of the digital image. For example, the brightness of the digital image can include luminance or color. The methods further include the actions of bringing out maximum available detail in the digital image at least in part by applying to the brightness of the digital image a first gamma exponent that is equal to one divided by a negative of an average logarithm of the brightness of the digital image.

The foregoing and other implementations can each optionally include one or more of the following features, alone or in combination. In some implementations, the methods can include the actions of determining the average as a robust or weighted average. Determining brightness of the digital image can include obtaining brightness values for a plurality of pixels that collectively define the digital image. In some implementations, the methods can include the actions of mapping input brightness values to output brightness values, and then determining the average log brightness of the image. Mapping of the input brightness values to the output brightness values can account for display calibration, and/or the human visual system and/or image encoding.

In some implementations, the methods can include the actions of obtaining an adjusted digital image by said applying the first gamma exponent to the brightness of the digital image, and generating a final digital image at least in part by mapping the adjusted digital image by a function. Once again, mapping can account for display calibration, a human visual system and/or image encoding. Determining the brightness of the digital image can include obtaining brightness values for a plurality of pixels that collectively define the digital image. In some implementations, the methods can further include the actions of transforming input brightness values by using a mapping, and determining a second gamma exponent based on the transformed input brightness values. Furthermore, the methods can include the actions of applying the second gamma exponent to the transformed input brightness values to obtain output brightness values, and transforming the output brightness values by another function. The second gamma exponent can be a function of the first gamma exponent. Also, the methods can further include the actions of empirically deriving the function that maps the first gamma exponent to the second gamma exponent.

In some implementations, the first gamma exponent can be determined locally in the digital image. In some implementations, the first gamma exponent can be used to compress a dynamic range of the digital image. In some implementations, the first gamma exponent can be used to locally sharpen the digital image. In some implementations, the first gamma exponent can be used as a parameter for other image processing functions, where the other image processing functions include one or more of tone adjustment, contrast adjustment and brightness adjustment.

Another innovative aspect of the subject matter described in this specification can be implemented in methods that include the actions of determining brightness values for a plurality of pixels that collectively define a digital image, and generating a gamma based on the brightness values. Generating the gamma includes determining a set of logarithm values of the brightness values, determining a statistic of the set of the logarithm values, and setting the gamma equal to a negative inverse of the statistic. Additionally, the methods include the actions of transforming the brightness values for the plurality of the pixels that collectively define the image based on the generated gamma to maximize information in the image.

The foregoing and other implementations can each optionally include one or more of the following features, alone or in combination. In some implementations, generating the gamma is performed globally to the image. In some implementation, generating the gamma is performed locally by using a local filter, e.g., a Gaussian filter, an 1/r filter, and other appropriate spatial filters. For example, when the statistic is a mean, determining the statistic includes determining the mean of the set of logarithm values. In another example, when the statistic is a weighted average, determining the statistic includes determining the weighted average of the set of logarithm values. As yet another example, when the statistic is a median, determining the statistic includes determining the median of the set of logarithm values.

In some implementations, the methods can include the actions of encoding the brightness values for the plurality of the pixels that collectively define the digital image. Encoding can be performed in accordance with display and/or human perception calibration. For example, encoding the brightness values is performed prior to determining the set of the logarithm values. In this example, encoding the brightness values can be additionally performed after transforming based on the generated gamma. As another example, encoding the brightness values is performed after transforming based on the generated gamma. In some implementations, the methods can include the actions of adjusting tone and/or contrast of the digital image based on the generated gamma. In some implementations, the methods can include the actions of sharpening the digital image based on the generated gamma.

Other implementations of the above aspects include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Particular implementations of the subject matter described in this specification can be configured so as to realize one or more of the following advantages. For example, the disclosed technologies can be used to determine a gamma exponent, such that when a corresponding gamma transformation is applied to an input image, an output image with maximum information content is generated. The foregoing gamma transformation globally maximizes the information content in the image. Moreover, a gamma transformation that maximizes information content locally in the image also can be applied in accordance with the techniques described in this specification. Once an image that conveys maximal information is obtained (by globally or locally applying the described gamma transformation,) there is no need for a second application of the gamma transformation (because more information than the already conveyed maximal information cannot be obtained through additional transformations.) Based on the foregoing property of the described gamma transformation, the dynamic range of the output image that conveys maximal information can be compressed. Also, the determined gamma can be applied to informationally sharpen a local portion of an image.

In addition to having maximum information content, the image output by the gamma transformation based on the determined gamma exponent takes into account image encodings and a range of displayable brightness. Further, the output image obtained as a result of the described gamma transformation not only has maximum information content, but also takes account of properties of the human visual system. Furthermore, the determined gamma can also be used as a parameter to other image processing modules, e.g. a module to change image brightness.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
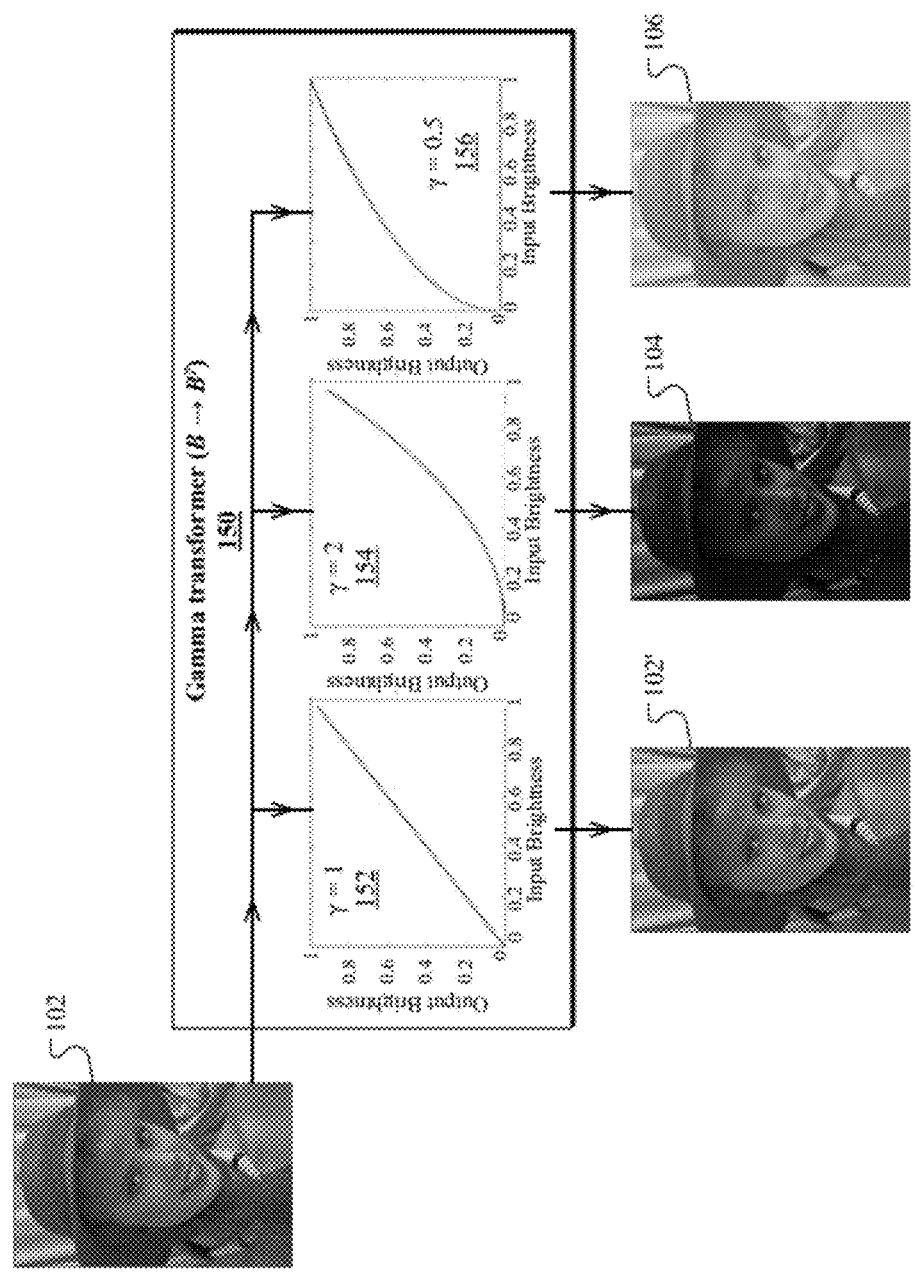
FIG. 1 shows an example of a gamma transformer.

The premise at the foundation of the techniques described in this specification is that a gamma exponent should be determined such that a gamma transformation based on the determined gamma exponent brings out details in an image to maximize information conveyed by the image. Thus, the disclosed techniques are developed based on the concept of information, or entropy.

Suppose that four brightness levels e.g. 0, 0.33, 0.67 and 1 are used to characterize image brightness. Moreover, for a given test image only brightness values of 0.33 and 0.67 are present, i.e., there are no pixel values with 0s or 1s. Intuitively, there is less information in this image than is expected as only two brightness levels are used for the given test image that has neither dark nor light pixels. Hence, the number of bits it takes to represent image data is related to the amount of information in an image. Given a four brightness-value image, a potential brightness coding would be to assign the binary numbers 00, 01, 10 and 11 to represent the four brightness levels. However, it only takes two bits to represent each brightness level for the given test image, because two of the brightness values do not occur, so only 0.33 and 0.67 levels need be encoded as respectively 0 and 1 (only 1-bit per pixel). If the statistics of the given test image were not used as described above, then the given test image could have been coded with twice the number of bits required.

The number of bits it takes to encode an image (using an optimal encoding scheme) is called entropy and is determined as:

$$\text{Entropy} = E_b = -\sum_{i=1}^{N} p_i \log_2(p_i). \quad (3)$$

In equation (3), $p_i$ denotes the probability of the $i^{th}$ brightness value (or generally a character in an alphabet) to be encoded. The log probability is the estimate of the number of bits it takes to optimally code the character set. It can be proven that there always exists an optimal encoding scheme (assignment of bits to brightness values) such that entropy bound given by equation (3) is met. Entropy $E_b$ in equation (3) is an explicit measure of the average number of bits (hence the use of a logarithm to the base 2). However, the base of the logarithm can be changed to obtain an equivalent measure. For example, to ease the mathematical analysis described below in this specification, the entropy can be determined with natural logs in the following manner:

$$\text{Entropy} = E = -\sum_{i=1}^{N} p_i \ln(p_i) = \frac{1}{\ln 2} E_b. \quad (4)$$

It is also useful to consider entropy in a continuous domain where p(x) is a probability density function. Differential entropy is defined as:

$$(\text{Differential})\text{Entropy} = \int_0^1 p(x) \ln p(x) dx \quad (5).$$

In accordance with equation (5), the more even the distribution of probabilities p(x), the higher the differential entropy. In the example described above, if all brightness levels were equally likely, the coding scheme having four levels is optimal and two bits per pixel are needed to encode image brightness. A set of characters which all occur equally often has a highest entropy, i.e., such set of characters can convey the most information. Intuitively this makes sense, in the following manner: If a starting histogram is uniform, but some transformation changes the probabilities of two characters A and B so that p(A)>p(B), then log(p(A))<log(p(B)), i.e., A should be coded with fewer bits for the transformed histogram. In this case, A occurs more frequently than B, so the overall entropy is reduced.

Figure 3:
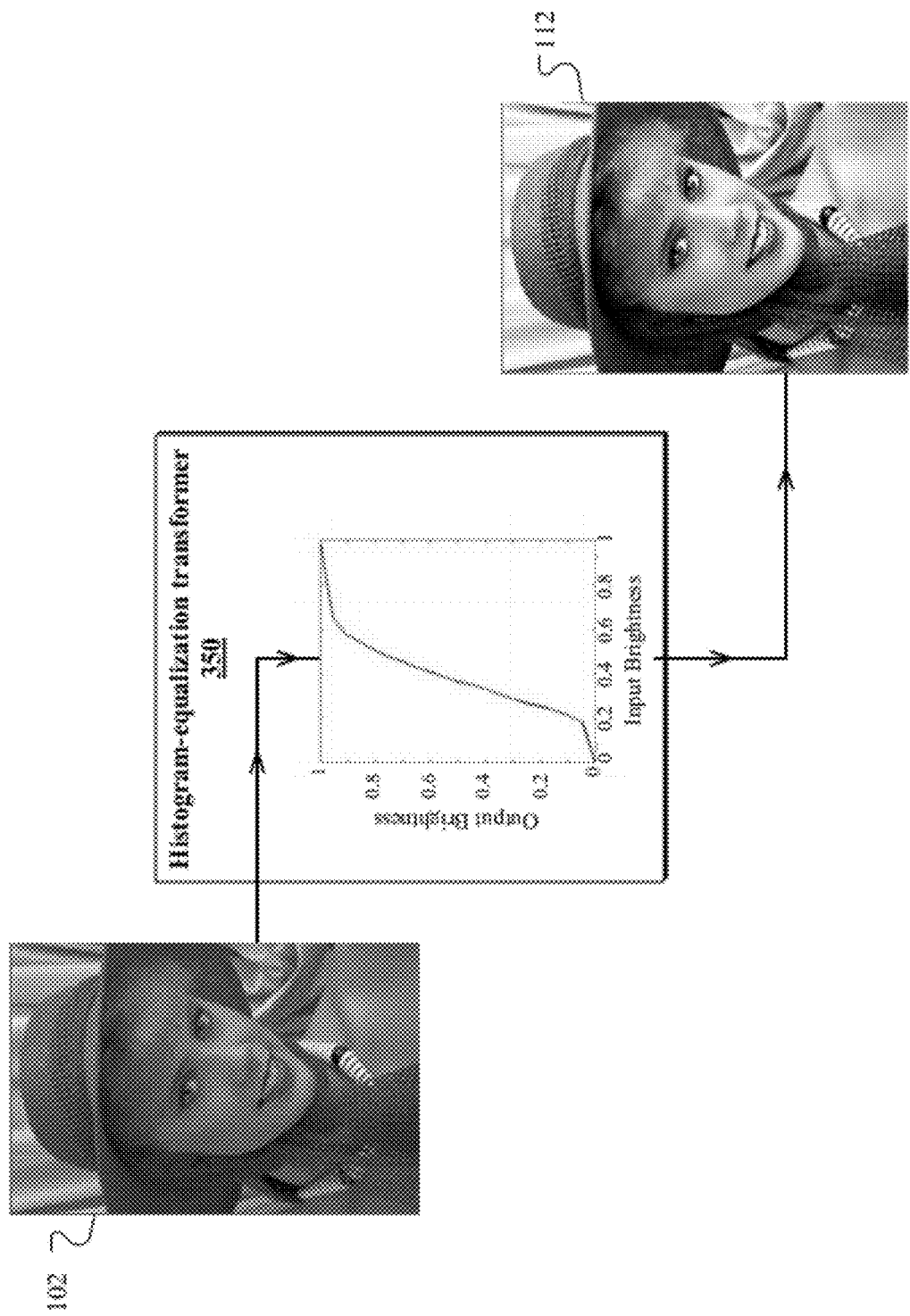
FIG. 3 shows an example of a histogram-equalization transformer.

FIG. 3 shows an example of a histogram-equalization transformer 350 used to adjust on original image 102. The histogram-equalization transformer 350 uses a mapping from input to output brightness values such that the output image 112 has a flat histogram (i.e., all brightness values have equal probability). In an information theory sense, images with flat histograms have maximum entropy, i.e., such images convey the maximum amount of information. Accordingly, the brightness values in the resulting image 112 are equiprobable. Many aspects of the processed image 112 convey greater detail with respect to the original image 102. For example, note the hair or the texture on the hat. The overall image contrast of the output image 112 also is increased with respect to the input image 102. However, the resulting image 112 is not natural (no one looks like that.) Further, the histogram-equalization transformer 350 distorts chromatic aspects of the original image 102 (not shown here), and thus, the resulting image 112 represents an unnatural reproduction of the original image 102.

The unnaturalness of the processed image 112 can be explained by considering the transfer function associated with the histogram-equalization transformer 350 that maps input to output brightness levels. Specifically, the middle part of the transfer function of transformer 350 is steep (indicating large contrast stretching), while the dark (shadow) and light (highlight) detail is compressed. Consequently, the scarf to the left of the face is less visible and the detail on the necklace is blown out. The transitions from shadow to mid-tones and mid-tones to highlight of the processed image 112 are very sharp (discontinuous). Sharp changes in tone curves can result in false contouring in the output image 112. An example of this is the hair under the hat. In the original image 102 all the hair has similar brightness, while in the output image 112 there is a clear transition from light to dark.

Figure 4:
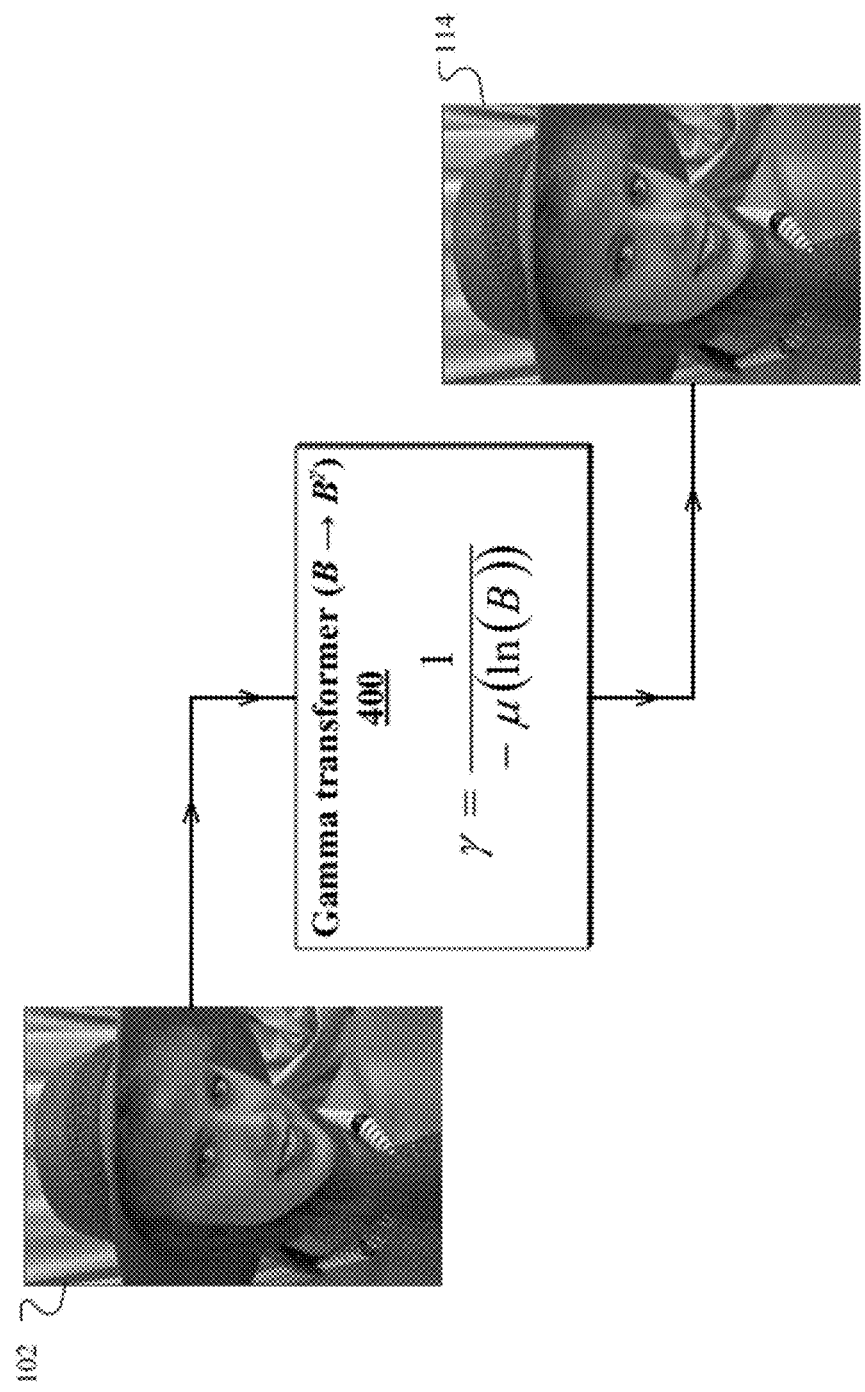
FIG. 4 shows an example implementation of a gamma transformer that maximizes an amount of information conveyed by an image.

FIG. 4 shows an example implementation of a gamma transformer 400 configured, over all choices of gamma, to maximize entropy and, thus, to transform an original image 102 into an image 114 that conveys a maximum amount of information. In addition, the gamma transformer 400 is configured to output an image 114 that is a natural reproduction of the original image 102, and, hence, to avoid the unnatural look and feel of images transformed based on histogram equalization (as described above in connection with FIG. 3.) Such natural reproduction can be accomplished because the gamma transformer 400 operates by smoothly mapping brightness of the original image 102 to brightness of the output image 114, in contrast with the discontinuous mapping used by the histogram-equalization transformer 350.

The gamma transformer 400 uses a gamma transformation (or gamma adjustment) having an exponent gamma equal to $-1/\mu(\ln(B))$, that when applied to the original image 102 generates an output image 114 having maximum entropy. The quantity $\mu(\ln(B))$ represents the mean log brightness of the original image 102. Brightness values $B_{ij}=x$ are in the range $(0,1]$ and are distributed based on a probability density function $p(x)$. The exponent $\gamma$ associated with the gamma transformer 400 corresponds to the maximum differential entropy E of the output image 114 as shown in detail below.

Let x denote brightness values (or simply brightness), and $p(x)$ the probability of brightness x for the input image. Probability density functions sum up to 1, $$\int_0^1 p(x)dx = 1 \quad (6).$$

Henceforth in this specification, limits of integration are implicitly over the range 0 to 1. By applying a gamma adjustment, the brightness of the input image changes to brightness of the adjusted image, y, in accordance with equation (1), $$y = x^\gamma \quad (7).$$

The density of the probability distributions for the input and output images should, in the following sense, be the same $$p(y)dy = p(x)dx \quad (8).$$

Since dx and dy denote infinitesimals equation (8) can be rewritten as:

$$p(y) = p(x)\frac{dx}{dy}. \quad (9)$$

Solving for dx/dy and writing y in terms of x, the probability distribution for the output images can be determined to be $$p(y) = p(y^{1/\gamma})\frac{1}{\gamma}y^{(1-\gamma)/\gamma}. \quad (10)$$

The differential entropy, $$E = -\int p(y)\ln(p(y))dy \quad (11),$$

can be maximized as described below. Equation (10) can be substituted into equation (11) to express the differential entropy E as:

$$\int p(y^{1/\gamma})\frac{1}{\gamma}y^{(1-\gamma)/\gamma}\ln\left(p(y^{1/\gamma})\frac{1}{\gamma}y^{(1-\gamma)/\gamma}\right)dy. \quad (12)$$

To simplify integration, z and its derivatives can be defined as:

$$z = y^{1/\gamma} \quad y = z^\gamma \quad \frac{dz}{dy} = \frac{1}{\gamma}y^{(1-\gamma)/\gamma} \quad dy = \frac{dz}{\frac{1}{\gamma}y^{(1-\gamma)/\gamma}}. \quad (13)$$

Substituting equation (13) into equation (12), the differential entropy E can be expressed as:

$$-\int p(z)\ln\left(p(z)\frac{1}{\gamma}z^{(\gamma-1)}\right)dz. \quad (14)$$

Expanding the multiplication of factors under the logarithm function as addition of terms, the differential entropy E can be expressed as a sum of three terms:

$$E = -\left(\int p(z)\ln(p(z))dz + \int p(z)\ln\frac{1}{\gamma}dz + \int p(z)\ln(z^{1-\gamma})dz\right). \quad (15)$$

Using equation (6) and properties of the logarithm function, the three terms of the differential entropy E can be expressed as:

$$E = -\left(\int p(z)\ln(p(z))dz + \ln\frac{1}{\gamma} + (1-\gamma)\int p(z)\ln(z)dz\right). \quad (16)$$

To maximize the differential entropy E, equation 16 is differentiated with respect to gamma, and the derivative of the differential entropy E is equated to 0 (to find stationary points in $\gamma$-space):

$$\frac{dE}{d\gamma} = -\left(\frac{-1}{\gamma} - \int p(z)\ln(z)dz\right) = 0 \Rightarrow \gamma = \frac{-1}{\int p(z)\ln(z)dz}. \quad (17)$$

According to equation (17), there is only one stationary point. The latter corresponds to a maximum of the differential entropy E, because the $2^{nd}$ derivative at this value of $\gamma$ is less than 0.

$$2nd\ deriv.\ test\ \frac{d^2E}{d\gamma^2} = \frac{-1}{\gamma^2} < 0 \Rightarrow maximum\ (entropy). \quad (18)$$

Based on equations (7) and (13), z is the same as x, and therefore $\gamma$ corresponding to the maximum differential entropy E can be expressed as:

$$z = x^{1/\gamma} \Rightarrow z = x \Rightarrow \gamma = \frac{-1}{\int p(x)\ln(x)dx}. \quad (19)$$

Remembering that x denotes brightness of the original image, the denominator of equation (19) is simply the mean of the logarithm of the brightness of the image, μ. Accordingly, γ corresponding to the maximum differential entropy E can be rewritten as:

$$\gamma = \frac{-1}{\mu(\ln(B))} = \frac{1}{-\mu(\ln(B))}. \tag{20}$$

For an N pixel image, the exponent γ corresponding to the maximum differential entropy E can be rewritten in discrete form as:

$$\gamma = \frac{1}{-\sum_{i,j} \ln(B_{ij})/N}. \tag{21}$$

The exponent γ determined based on equations (20) or (21) can be used by the gamma transformer 400 to transform an original image 102 to generate an output image 114 that has maximum entropy. The output image 114 generated in this manner by the gamma transformer 400 can convey a maximum amount of information. Throughout this specification, the gamma exponent determined based on equations (20) or (21) is referred to interchangeably as optimal gamma. For example, an optimal γ for generating the output image 114 was determined based on equation (21) to be γ=0.96. As the input image 102 is a high quality image, the gamma transformer 400 determined a gamma (close in value to 1) that does not alter the input image 102 much.

Figure 2:
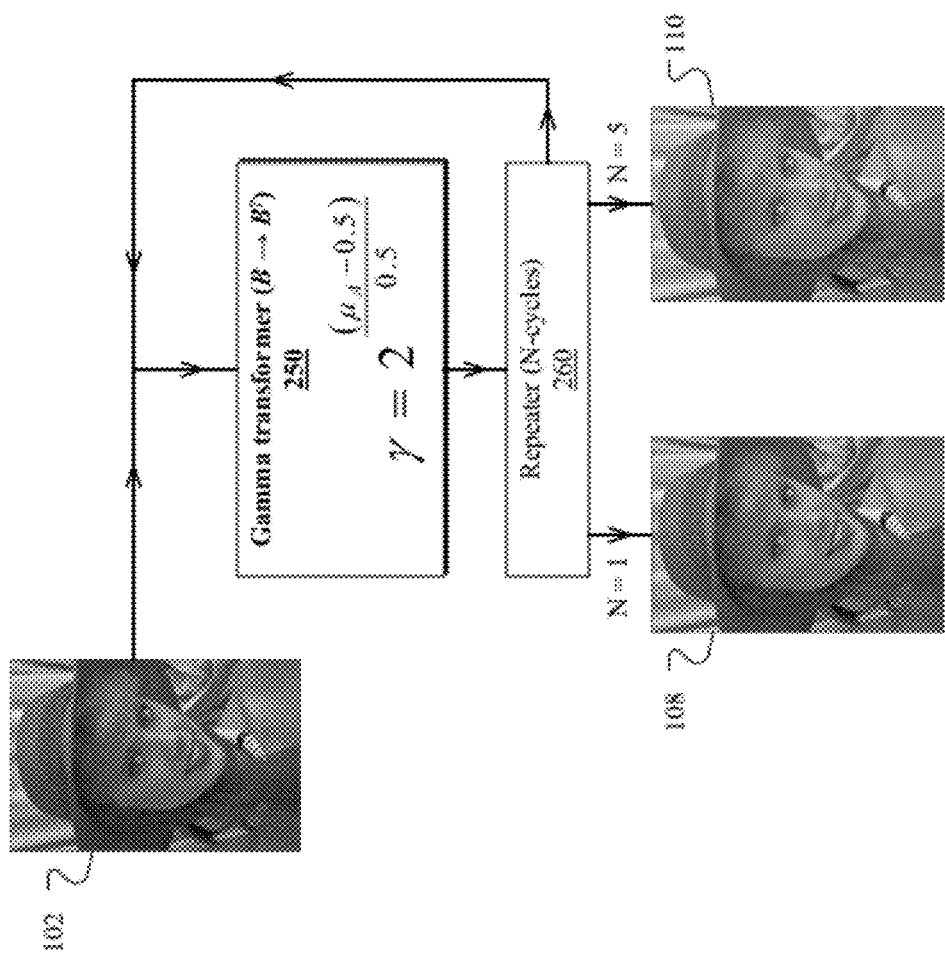
FIG. 2 shows another example of a gamma transformer.
Figure 5A:
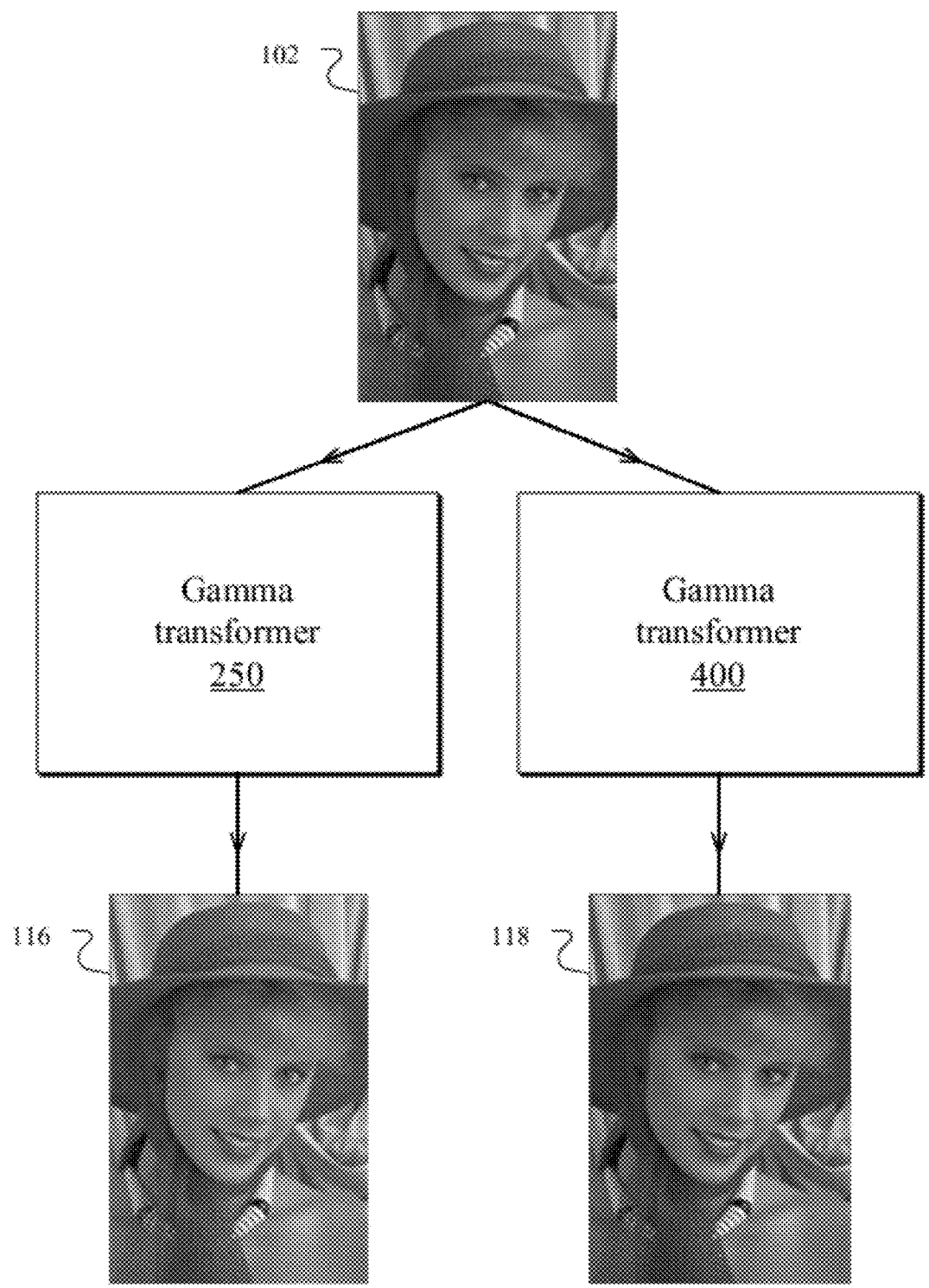
FIGS. 5A, 5B and 5C show examples of applications of the gamma transformers described in this specification.
Figure 5B:
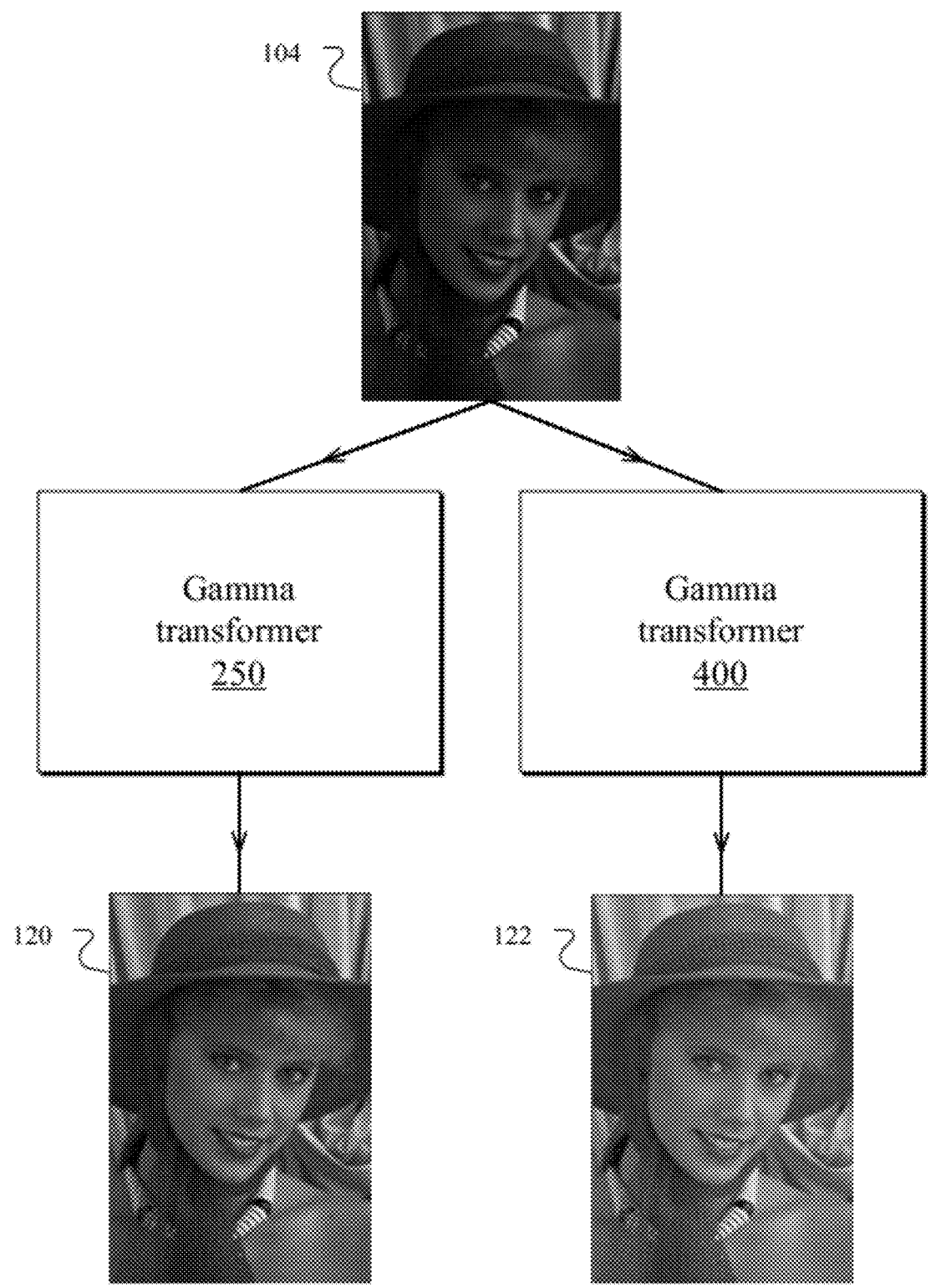
Figure 5C:
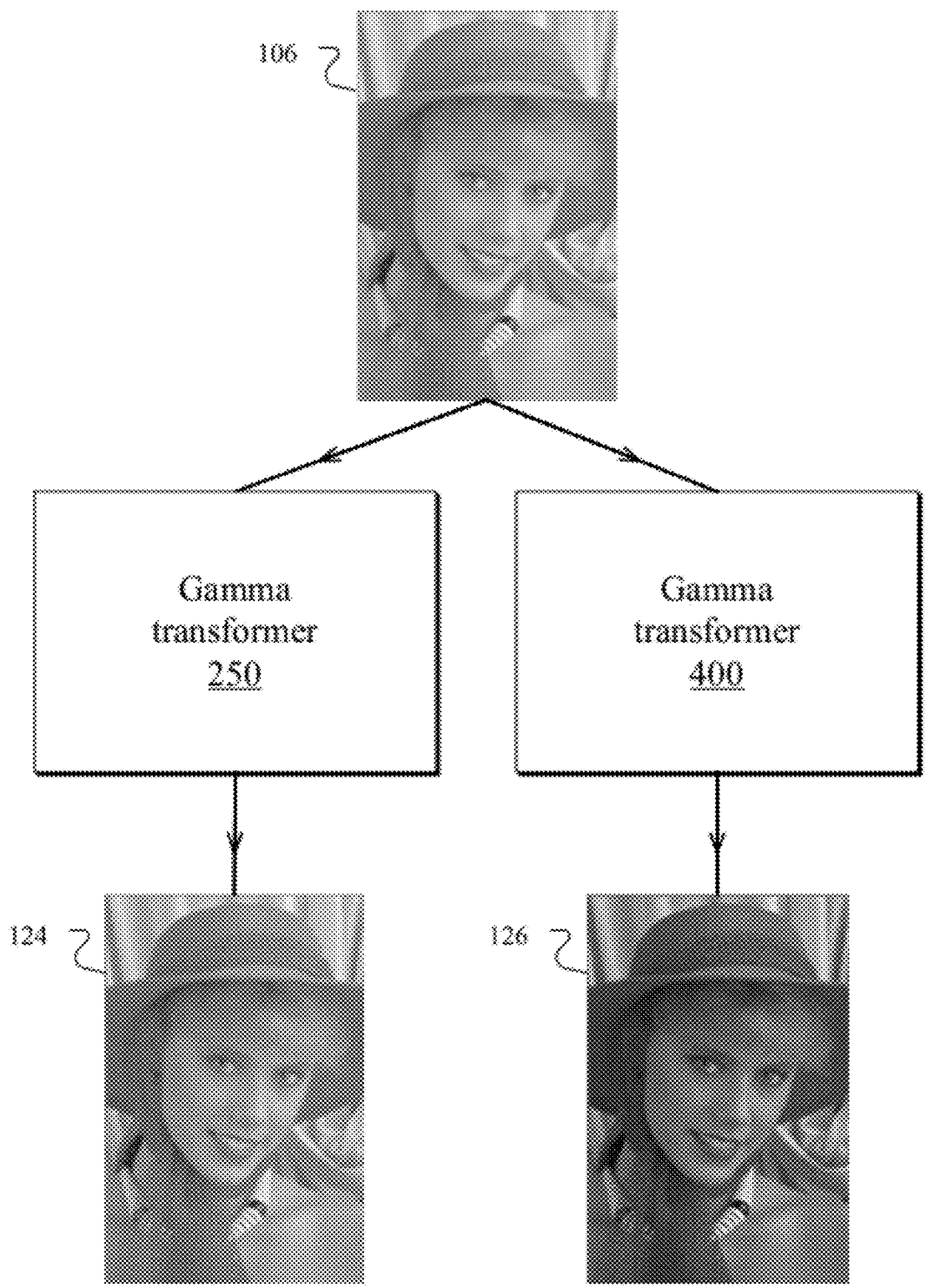

FIG. 5A shows transforming an input image 102 by applying the gamma transformer 250 (described above in connection with FIG. 2) to generate an output image 116 side-by-side with applying the gamma transformer 400 (described above in connection with FIG. 4) to generate an output image 118. Further, FIG. 5B shows transforming an input image 104 by applying the gamma transformer 250 to generate an output image 120 side-by-side with applying the gamma transformer 400 to generate the output image 122. Furthermore, FIG. 5C shows transforming an input image 106 by applying the gamma transformer 250 to generate an output image 124 side-by-side with applying the gamma transformer 400 to generate the output image 126.

The output images 116, 120, 124 generated by the gamma transformer 250 may not be optimally adjusted. For instance, the dark and bright output images (120 and 124) are respectively brighter and darker than their input images (104 and 106), but they do not reach a rendering close to the original image 102. In contrast, the gamma transformer 400 using an optimal gamma exponent renders substantially identical output images 118, 122 and 126, each of which being a rendering close to the original image 102. The results presented in FIGS. 5A, 5B and 5C show that given a gamma transformer 400 which uses an optimal gamma (calculated based on equation (21)) to adjust an input image, applying the gamma transformation associated with the gamma transformer 400 a second time would be unnecessary, because the second calculation of gamma would lead to a γ=1.

For example, it can be shown that if the exponent gamma is determined using equation (21) for image brightness which has already been optimally gamma adjusted (using the gamma transformer 400) then the determined gamma is equal to 1. In log space, the application of an optimal gamma adjustment is equivalent to dividing by the negative of the average of the log image. Therefore, applying the optimal gamma adjustment to image brightness a first time results in:

$$\ln(B^\gamma) = \gamma\ln(B) = B_{ij}^\gamma \rightarrow \gamma\ln(B_{ij}) \rightarrow \frac{\ln B}{-\sum_{i,j} \ln(B_{ij})/N}. \tag{22}$$

The average log brightness (the denominator term of optimal gamma) can now be calculated to obtain $$\frac{-\sum_{i,j} \ln B_{ij}/N}{-\sum_{i,j} \ln(B_{ij})/N} = 1. \tag{23}$$

The ratio in equation (23) represents the exponent gamma determined to perform another adjustment using the gamma transformer 400 of an image that has been already adjusted using the gamma transformer 400. Note that the exponent gamma determined based on equation (23) is equal to 1, as anticipated above in connection with FIGS. 5A, 5B and 5C.

The following section is related to adjusting an image using the gamma transformer 400 and encoding the image, e.g., to facilitate displaying the encoded image on a display device and/or to improve human perception of brightness levels. In some implementations, the gamma transformer 400 can be used to adjust images based on the optimum gamma exponent prior to encoding the adjusted images. In other implementations, images are first encoded and then the optimum gamma exponent used by the gamma transformer 400 to adjust the encoded images can be determined.

Display devices generally have a power function non-linearity. That is, if a display device is driven with numbers in the range [0, 1] the output brightness is proportional to the linear input (L) raised to some power (often 2.2). For this reason images are often encoded with a reciprocal power so that the correct brightness is generated by the display device:

$$\text{out} = L^{2.2} L = (L^{1/1.2})^{2.2} B = \text{encoded\_image} = L^{1/2.2} \tag{24}.$$

For example, the images used in this specification are encoded according to equation (24). It was described above (in connection with equations (22) and (23) and with FIGS. 5A-5C) that image brightness values B raised to any power, k, result in the same output image, if a gamma adjustment that uses an optimal exponent gamma is applied to the image. Denoting the optimal gamma as a function γ( ) the following equalities hold:

$$L^{\gamma(L)}(L^{1/2.2})^{\gamma(L1/2.2)} = B^{\gamma(B)} = (B^k)^{\gamma(B^k)} \tag{25}.$$

Equation (25) confirms that the linear image L and the encoded image B will be the same after optimal gamma adjustment. Moreover, an image adjusted using the gamma transformer 400 can be displayed based on the combined properties of the target display and of a human visual system. The human visual system is based on how the combination of human eye and brain perceives brightness levels, P. The latter can be proportional to the cube root of a linear image L (e.g., in the CIE Lab color space). Thus, P raised to the power of the optimal gamma results in a distribution of values that is optimal in cube root space. To transform from the human visual system back to linear space, the adjusted perceptual values can be raised to the power of 3:

$$P = L^{1/3} L_{\text{gamma\_adjusted}} = (P^{\gamma(P)})^3 \tag{26}.$$

Adjustment of the linear image L by its optimal gamma can lead to the same output values:

$$L^{\gamma(L)} = P^{\gamma(P)} \Rightarrow L_{gamma\_adjusted} = (L^{\gamma(L)})^3 \quad (27).$$

To display a cube root image correctly, all the brightness values can be raised to a power of 3 (to linearize the same) and then the correct gamma encoding (assuming a particular display) can be applied in accordance with equations (24) and (27):

$$B = (L_{gamma\_adjusted})^{1/2.2} \Rightarrow B = L^{3\gamma(L)/2.2} \quad (28).$$

Equation (28) provides a prescription for adjusting an image based on the optimal gamma exponent followed by encoding the adjusted image for display. As described above, the optimal gamma exponent can be determined based on equation (21) for the linear values corresponding to the linear image L. The linear image L can be raised to the power of the optimal gamma to obtain a gamma adjusted linear image L. Then, the adjusted L, can be raised to the power 3/2.2 to generate an encoded image ready for display. Moreover, because an input image raised to a power, k, will map to the same output image after an adjustment based on optimal gamma, equation (28) can be rewritten as $$B = L^{3\gamma(L)/2.2} = P^{3\gamma(P)/2.2} = (L^k)^{3\gamma(L^k)/2.2} \quad (29).$$

Assuming that image brightness values that are of interest to the human visual system are linear brightness values raised to power (1/2.2). In this case, the encoded output brightness image for an input brightness image $B_{input}$ is equal to:

$$B_{output} = (B_{input})^{\gamma(B_{input})} \quad (30).$$

The examples of gamma transformations used by the gamma transformer 400 correspond to equation (30). In conclusion, the optimal gamma for an encoded image can be determined, and then a gamma transformation based on the determined optimal gamma can be applied it directly to the encoded image. In general, for any input image I (linear, encoded, or otherwise raised to any arbitrary power), the image to drive the display is equal to:

$$I_{display} = I^{\gamma(I)D} \quad (31),$$

where D is a scalar incorporating knowledge about the gamma encoding of the image and assumptions about the human visual system. The scalar D may also be found empirically by psycho-visual experimentation.

Moreover, images can be encoded using a function g( ) that is more complex than a gamma exponent and the mapping f( ) from images adjusted based on optimal gamma to the images output based on equation (31) may also be complex. In general, the images adjusted based on optimal gamma can be generated as $$I_{display} = g(f(I)^{\gamma(f(I))}) \quad (32),$$

Another gamma function γ' can be derived as:

$$\gamma' = h(\gamma) \quad (33).$$

In equation (33), function h( ) is some function of gamma. For example, an optimal gamma determined based on any one of equations (20), (21) or (32) for an image depicting a night time scene can, unnaturally, re-render the image so it has similar brightness levels as another image depicting the equivalent daylight scene. The function h( ) could limit the maximum gamma that is applied to an image. The shape of the function h( ) can be derived by psychophysical experiments.

The optimal gamma determined based on equations (20) or (21) as being inversely proportional to the (negative of) the mean of the logarithm of the image brightness is only one of multiple implementations of the optimal gamma exponent. In other implementations, the optimal gamma can be determined based on the median of the logarithm of the image brightness (since the median is robust to outliers). In some other implementations, the optimal gamma can be determined based on a weighted average of the logarithm of the image brightness.

Figure 6:
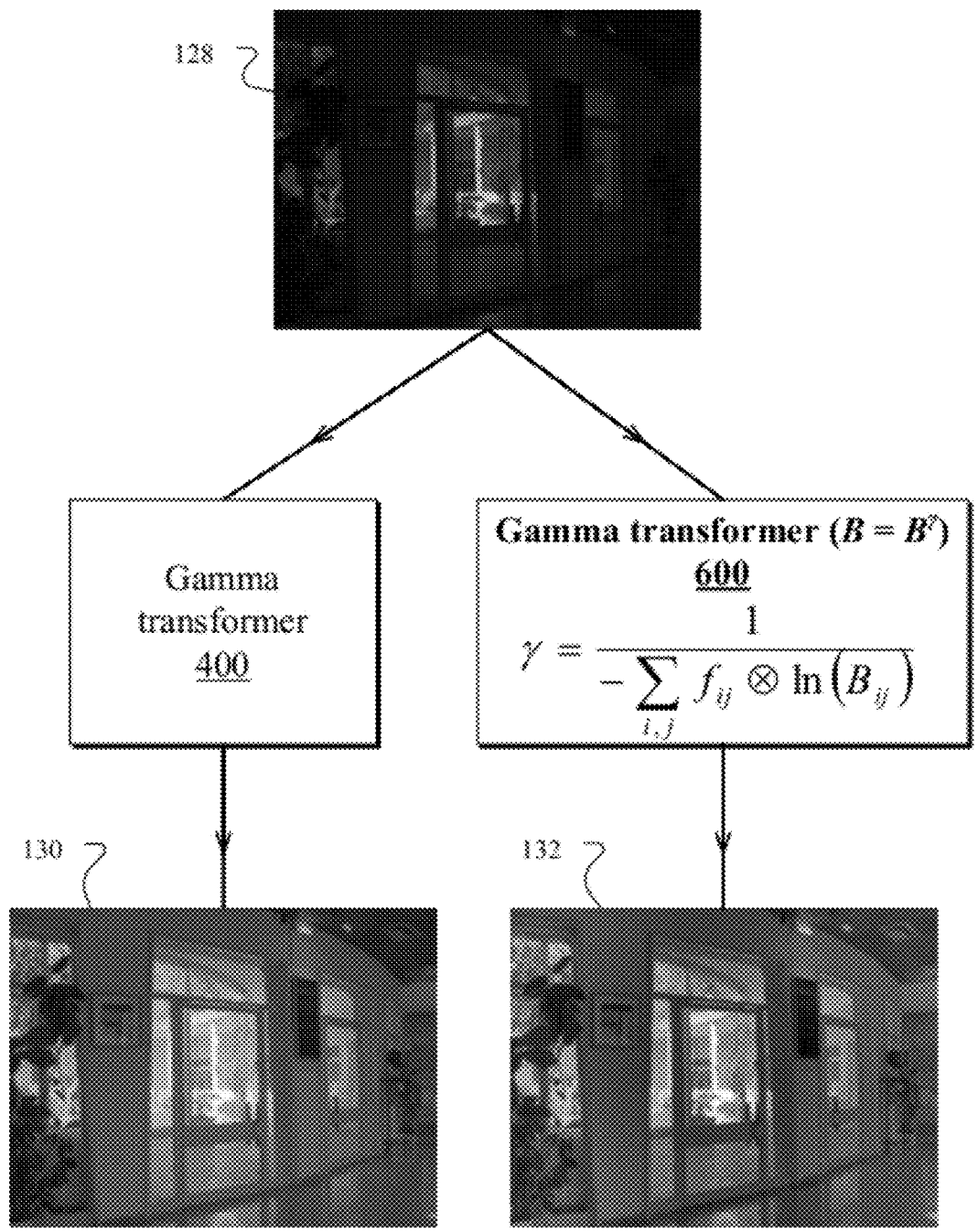
FIG. 6 shows another example implementation of a gamma transformer that maximizes an amount of information conveyed by an image.

FIG. 6 shows an example implementation of a gamma transformer 600 configured to perform an adjustment of an image based on a locally determined optimal gamma. Brightness levels can be calculated locally in the image. The gamma transformer 600 uses a local gamma transformation having an optimal gamma exponent equal to $$\gamma = \frac{1}{-\sum_{i,j} f_{ij} \otimes \ln(B_{ij})}, \quad (34)$$

where the log of the image brightness is convolved ⊗ with a spatial filter, $f_{ij}$. The spatial filter $f_{ij}$ can be any appropriate local filter, such as a Gaussian, 1/r filter or inverse exponential.

In addition, FIG. 6 shows transforming an input image 130 by applying the gamma transformer 400 (based on a global optimal gamma transformation described above in connection with FIG. 4) to generate an output image 132 side-by-side with applying the gamma transformer 600 (based on a local optimal gamma transformation) to generate output image 134. The input image 130 has a high dynamic range. However, notice that almost all the detail in the shadows is not visible. Notice how the local adjustment performed with the gamma transformer 600 results in a more natural image 134 as detail is brought out, locally, in a more natural manner than in the output image 132 obtained by global adjustment performed with the gamma transformer 400. In this example, all three images 130, 132, 134 are stretched so that the brightest and darkest pixels are respectively 1 and 0. As such, the optimal gamma correction can be applied in conjunction with many other operations for manipulating images.

The input image 130 is synthesized from multiple exposures and, hence, it is a high dynamic range image (where dynamic range is defined as the ratio of brightest to darkest (non-zero) regions.) In this example, the input image 130 has a dynamic range of greater than 20,000. In contrast, the output image 134 (generated by adjusting the input image 130 using the gamma transformer 600) has a dynamic range of less than 500. Thus, the optimal gamma adjustment described in this specification can be used at least in part to compress the dynamic range of images. For example, a high dynamic range image has a skewed histogram, because a lot of pixels have very small dark values and data that is visible occurs less frequently. Thus a luminance histogram of such an image is skewed to dark values. This histogram is very easy to efficiently encode since most values are dark. Applying the optimal gamma transformation based on equations (21) or (34) moves many of the dark values into brighter counterparts and the post-gamma applied histogram is much flatter than the histogram of the original image. In general, high dynamic range images often have highly skewed histograms. These histograms become flatter after optimal gamma application. The detail that was not visible before becomes visible, or equivalently, the high dynamic range of an original image can be compressed by applying the optimal gamma transformation described in this specification.

Un-sharp masking is an image transformation through which high frequency image information is added to an image:

$$I \to I + \beta(I - \mu_{k \times k}(I)) \quad (35).$$

Here α is in the range [0,1] and k defines the number of pixels over which a local average is calculated (e.g. the images can be convolved with a k×k Gaussian filter, where k=3, 5, 7, ...) The variable a controls the degree to which the image becomes visibly sharper.

Gamma image sharpening is another image transformation defined as:

$$I \to I^{1 - \alpha \gamma_{k \times k}(I)} \quad (36),$$

where $\gamma_{k \times k}$ represents the optimal gamma calculated based on equation (34) using a filter with a k×k window. Again α is in [0,1] and as α increases the resulting image becomes sharper. Image sharpening in accordance with equation (35) can add information to an image to increase the image's size, e.g., pixel brightness values [0.2, 0.2, 0.4, 0.4] may become [0.2, 0.15, 0.45, 0.4] after sharpening. Gamma sharpening based on equation (36) can mimic the foregoing result albeit from the vantage of gamma function. Note that un-sharp masking based on equation (35) in the limit of α→1 can generate a very high contrast image (having many bright and dark pixels). Such an image has lower entropy than an un-transformed, low contrast image. Also note that by applying, locally in an image, the optimal entropy gamma transformation in accordance with equations (2) and (34) results in shifted pixel values so that their log brightness is close to −1. While such dynamic range compression may be useful for making content in a high-dynamic range image visible, it can, in effect, diminish image sharpness. However, by applying the negative gamma in accordance with equation (36), values of log image brightness are being pushed away from −1. Viewed in this light, equation (36) can be interpreted as the original image "I" multiplied by a new higher contrast image to output a gamma sharpened image. This second image is raised to the power α, where α is a number typically close to 0. A variant of equation (36) is $$I \to \exp(J^*(-J\gamma_{k \times k}(I))^\alpha) \quad (37),$$

where J is ln(I).

The value of optimal gamma (calculated globally—per equations (20) or (21); calculated locally—per equation (34); or derived per equation (33)) can itself be used as input to other image processing functions. As an example, if the optimal gamma is 0.5 the image is being made brighter by an optimal gamma transformation. In some implementations, aspects of image appearance including, tonality, saturation, clipping brightness and contrast may be controlled based on a value of the optimal gamma exponent. For example, if a small optimal gamma, say 0.1 is applied to an image, then an already fairly bright region will be made very bright. For instance, a brightness value of 0.5 is mapped to 0.93. To map the corresponding color, RGB, pixel value, a determination would be performed, $$(R,G,B) \to 1.87*(R,G,B) \quad (38),$$

where 1.87=0.93/0.5. It could be the case that the new R, G or B has a value greater than 1 and so cannot be displayed. The set of colors that are displayable is sometimes called the displayable gamut. For RGB displays as considered in this specification, the displayable gamut is coded by R, G and B in the range [0,1]. If some images are coded with negative values or values greater than 1, the gamma transformations based on equations (21) and (34) can lead to colors which cannot be displayed. In this case, a gamut mapping procedure can map the transformed colors to the desired range. Sometimes gamut mapping can decrease the perceived saturation of the colors. So, the color saturation may need to be boosted for the image to look natural. Equally, gamut mapping sometimes results in image detail becoming compressed. This effect can be mitigated by applying a tone adjustment to the image.

Figure 7:
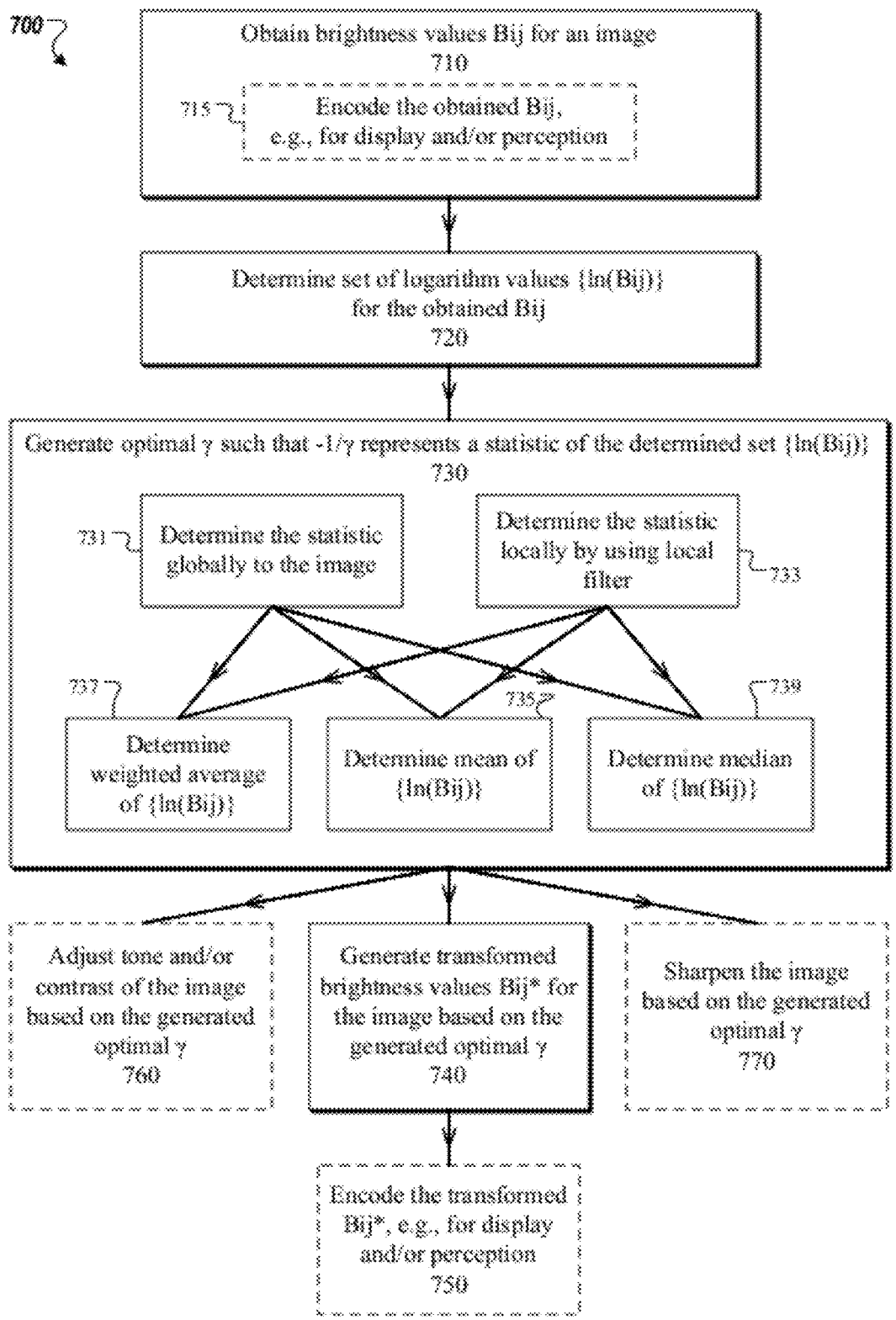
FIG. 7 shows an example of a method for adjusting an image using a gamma transformation that maximizes an amount of information conveyed by the image.

FIG. 7 shows an example of method 700 for adjusting an image using an optimal gamma transformation. The image can be stored in persistent memory or can be loaded in volatile memory. Such gamma transformation maximizes an amount of information conveyed by the transformed image. The method 700 can be implemented in the gamma transformer 400 described above in connection with FIG. 4. Also, the method 700 can be implemented in the gamma transformer 600 described above in connection with FIG. 4. The gamma transformers 400 or 600 can access the image in the memory to apply corresponding gamma transformations.

At 710, brightness values Bij associated with an image are obtained. Obtaining the brightness values Bij can include accessing the image stored in the persistent memory, or loading the image in volatile memory. The Bij values can correspond to a luminance channel, or any of the color channels, for instance. The brightness values Bij represent elements of a matrix and are associated with respective image pixels (i, j). For example, a total quantity N=(m×n) of brightness values Bij can be obtained corresponding to the N pixels of the (m×n)-image. At 715, obtaining the brightness values Bij can include encoding the obtained brightness values Bij prior to performing an optimal gamma adjustment. In some implementations, the obtained brightness values Bij can be encoded in accordance with equations (24) and (25) to account for display calibration. In some implementations, the obtained brightness values Bij can be encoded in accordance with equations (26) and (27) to account for perception by the human visual system.

At 720, a set of logarithm values $\{\ln(B_{ij})\}$ is determined for the obtained brightness values $B_{ij}$. For example, the determined set $\{\ln(B_{11}), \ln(B_{12}), \ldots, \ln(B_{mn})\}$ can include N elements corresponding to the N pixels of the (m×n)-image.

At 730, an optimal γ is generated such that the negative inverse of the optimal γ represents a statistic of the determined set $\{\ln(B_{ij})\}$. In some implementations 731, the statistic of the determined set $\{\ln(B_{ij})\}$ can be determined globally with respect to the image, in accordance with equation (21), for instance. In some implementations 733, the statistic of the determined set $\{\ln(B_{ij})\}$ can be determined locally by using a local filter, in accordance with equation (34). The filter can be a Gaussian filter, a 1/r filter, and the like, such that the optimal γ can be calculated locally over a (k×k) window, where k=3, 5, 7, ... pixels. In some implementations 735, whether determined globally or locally, the statistic can be determined as a mean of the determined set $\{\ln(B_{ij})\}$, in accordance with equations (21) or (34). For example, to generate the global optimal γ the mean of the set $\{\ln(B_{ij})\}$ having N elements is calculated as $(\ln(B_{11}) + \ln(B_{12}) + \ldots + \ln(B_{mn}))/N$. In some implementations 737, whether determined globally or locally, the statistic can be determined as a weighted average of the determined set $\{\ln(Bij)\}$. For example to generate the global optimal γ, the weighted mean of the set $\{\ln(Bij)\}$ having N elements is calculated as $(w_{11}*\ln(B_{11}) + w_{12}*\ln(B_{12}) + \ldots + w_{mn}*\ln(B_{mn}))/(w_{11} + w_{12} + \ldots + w_{mn})$. The weighted means $w_{11}, w_{12}, \ldots, w_{mn}$ can be associated with certain features of the corresponding pixels, for instance. In some implementations 739, the statistic can be determined as a median of the determined set $\{\ln(B_{ij})\}$, as medians tend to be more robust to outliers than averages. For example to generate the global optimal γ, the median of the determined set $\{ln(B_{ij})\}$ is determined as a value of an element in the set for which half of the set elements have lesser values and the other half of the elements have a greater value.

At 740, transformed brightness values Bij* are generated for the image based on the generated optimal γ. For example, the transformed brightness values Bij* can be generated in accordance with an optimal gamma transformation based on equation (30). In other implementations, transformed brightness values Bij* are generated for the image based on a derived γ' that is a function of the optimal γ, in accordance with equation (33). The optimal γ is generated at 730 based on either one of the equations (21) or (34). For example, the function γ' may be derived empirically from psychophysical experiments. In some other examples, the function γ' can be derived to limit the maximum value of gamma.

At 750, the transformed brightness values Bij* can be optionally encoded. In some implementations, the transformed brightness values Bij* can be encoded in accordance with equations (24) and (25) to account for display calibration. In some implementations, the transformed brightness values Bij* can be encoded in accordance with equations (26) and (27) to account for perception by the human visual system. In some implementations, the transformed brightness values Bij* can be encoded in accordance with equations (28), (29) and (31) to account for both display calibration and perception by the human visual system. In some implementations, the obtained brightness values Bij are transformed by a mapping at 715. The optimal gamma is generated at 720, 730, and applied at 740 to generate the transformed brightness values Bij*. The generated transformed brightness values Bij* can then be transformed by another function at 750. The process flow 715, 720, 730, 740 and 750 can be summarized mathematically by equation (32).

At 760, the optimal γ generated at 730 can be optionally used as a parameter for performing other image processing operations on the image. The other image processing operations can include one or more of tone adjustment or contrast adjustment, as described above in connection with equation (38).

At 770, the optimal γ generated at 730 can be optionally used to locally sharpen the image. Gamma sharpening based on the optimal γ is described above in connection with equations (36) and (37).

The systems and techniques described in this specification can be used in image processing applications other than the ones described above. For example, it is often useful to find edges in images. Edge detecting post optimal gamma correction can detect more structure than is found in the original image. It was described above in connection with FIGS. 5A, 5B and 5C that the same image may be coded with different gammas 1, 0.5, 2, respectively. Applying the optimal gamma to the input images 102, 104, 106 can result in output images 118, 122, 126, respectively, that convey the same maximal information. Accordingly, edge structure found in these output images 118, 122, 126 is the same. In addition, image based search often attempts to find images that are similar in some sense, e.g. images which have a similar color histogram. By determining an optimal gamma in accordance with equations (21) and (34) and by applying a gamma transformation based on the optimal gamma, the information content in an image is not only increased, but also the information content in the image is rendered independent of previously applied gamma transformations (supporting the matching of the same image content coded with different gammas).

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. The computer can also be part of an image acquisition device, such as digital camera. The digital camera can include a camera subsystem and an optical sensor, e.g. a charged coupled device (CCD) or a complementary metal-oxide semiconductor (CMOS) optical sensor, which can facilitate camera functions, such as capturing image and/or video data. The camera subsystem can include memory configured to store camera instructions to facilitate camera-related processes and functions.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method performed by one or more processes executing on a computer system, the method comprising:
    determining, using one or more processors, brightness values for a plurality of pixels that collectively define a digital image;
    generating, using the one or more processors, a gamma based on the brightness values, said generating the gamma comprising determining a set of logarithm values of the brightness values, determining a statistic of the set of the logarithm values, and setting the gamma equal to a negative inverse of the statistic; and
    transforming, using the one or more processors, the brightness values for the plurality of the pixels that collectively define the image based on the generated gamma to maximize information in the image.

2. The method of claim 1, where said generating the gamma is performed globally to the image.

3. The method of claim 1, where said generating the gamma is performed locally by using a local filter.

4. The method of claim 1, where the statistic is a mean and said determining the statistic includes determining the mean of the set of logarithm values.

5. The method of claim 1, where the statistic is a weighted average and said determining the statistic includes determining the weighted average of the set of logarithm values.

6. The method of claim 1, where the statistic is a median and said determining the statistic includes determining the median of the set of logarithm values.

7. The method of claim 1, further comprising encoding, using the one or more processors, the brightness values for the plurality of the pixels that collectively define the digital image, said encoding being performed in accordance with display and/or human perception calibration.

8. The method of claim 7, wherein said encoding the brightness values is performed prior to said determining the set of the logarithm values.

9. The method of claim 8, wherein said encoding the brightness values is performed after said transforming based on the generated gamma.

10. The method of claim 7, wherein said encoding the brightness values is performed after said transforming based on the generated gamma.

11. The method of claim 1, further comprising adjusting, using the one or more processors, tone and/or contrast of the digital image based on the generated gamma.

12. The method of claim 1, further comprising sharpening, using the one or more processors, the digital image based on the generated gamma.

13. A method performed by one or more processes executing on a computer system, the method comprising:
   receiving, using one or more processors, a digital image;
   determining, using the one or more processors, brightness of the digital image; and
   bringing out maximum available detail in the digital image at least in part by applying, using the one or more processors, to the brightness of the digital image a first gamma exponent that is equal to one divided by a negative of an average logarithm of the brightness of the digital image.

14. The method of claim 13, further comprising determining, using the one or more processors, the average as a robust or weighted average.

15. The method of claim 13, where the brightness of the digital image includes luminance or color.

16. The method of claim 13, where said determining brightness of the digital image comprises obtaining brightness values for a plurality of pixels that collectively define the digital image, and the method further comprises:
   mapping, using the one or more processors, input brightness values to output brightness values; and
   then determining, using the one or more processors, the average log brightness of the image.

17. The method of claim 16 where the mapping of the input brightness values to the output brightness values accounts for display calibration, and/or the human visual system and/or image encoding.

18. The method of claim 13, further comprising:
   obtaining, using the one or more processors, an adjusted digital image by said applying the first gamma exponent to the brightness of the digital image; and
   generating, using the one or more processors, a final digital image at least in part by mapping the adjusted digital image by a function.

19. The method of claim 18, where the mapping accounts for display calibration, a human visual system and/or image encoding.

20. The method of claim 13, where said determining brightness of the digital image comprises obtaining brightness values for a plurality of pixels that collectively define the digital image, and the method further comprises:
   transforming, using the one or more processors, input brightness values by using a mapping;
   determining, using the one or more processors, a second gamma exponent based on the transformed input brightness values;
   applying, using the one or more processors, the second gamma exponent to the transformed input brightness values to obtain output brightness values; and
   transforming, using the one or more processors, the output brightness values by another function.

21. The method of claim 20, where the second gamma exponent is a function of the first gamma exponent.

22. The method of claim 21, further comprising empirically deriving, using the one or more processors, the function that maps the first gamma exponent to the second gamma exponent.

23. The method of claim 13 where the first gamma exponent is determined locally in the digital image.

24. The method of claim 13 where the first gamma exponent is used to compress a dynamic range of the digital image.

25. The method of claim 13 where the first gamma exponent is used to locally sharpen the digital image.

26. The method of claim 13 where the first gamma exponent is used as a parameter for other image processing functions, where the other image processing functions include one or more of tone adjustment, contrast adjustment and brightness adjustment.

27. A non-transitory computer-readable storage medium encoded with a computer program, the program comprising instructions that when executed by one or more computers cause the one or more computers to perform operations comprising:
   determining brightness values for a plurality of pixels that collectively define a digital image;
   generating a gamma based on the brightness values, said generating the gamma comprising
      determining a set of logarithm values of the brightness values,
      determining a statistic of the set of the logarithm values, and
      setting the gamma equal to a negative inverse of the statistic; and
   transforming the brightness values for the plurality of the pixels that collectively define the image based on the generated gamma to maximize information in the image.

28. The non-transitory computer-readable storage medium of claim 27, wherein the operations further comprise encoding the brightness values for the plurality of the pixels that collectively define the digital image, said encoding being performed in accordance with display and/or human perception calibration.

29. A system comprising:
   one or more computers and one or more storage devices storing instructions that are operable, when executed by the one or more computers, to cause the one or more computers to perform operations comprising:
      determining brightness values for a plurality of pixels that collectively define a digital image;
      generating a gamma based on the brightness values, said generating the gamma comprising
         determining a set of logarithm values of the brightness values,
         determining a statistic of the set of the logarithm values, and
         setting the gamma equal to a negative inverse of the statistic; and
      transforming the brightness values for the plurality of the pixels that collectively define the image based on the generated gamma to maximize information in the image.

30. The system of claim 29, wherein said generating the gamma is performed locally by using a local filter.

* * * * *